United States Patent [19]

Solanki et al.

[11] Patent Number: 5,602,445
[45] Date of Patent: Feb. 11, 1997

[54] BLUE-VIOLET PHOSPHOR FOR USE IN ELECTROLUMINESCENT FLAT PANEL DISPLAYS

[75] Inventors: Rajendra Solanki, Portland, Oreg.; Weiran Kong, Sunnyvale, Calif.; Shafqat Ahmed, Beaverton, Oreg.

[73] Assignee: Oregon Graduate Institute of Science and Technology, Beaverton, Oreg.

[21] Appl. No.: 440,203

[22] Filed: May 12, 1995

[51] Int. Cl.$^6$ .............................. H01J 1/62; H05B 33/14
[52] U.S. Cl. .......................... 313/503; 313/506; 313/509
[58] Field of Search .................................... 313/502, 503, 313/505, 506, 509; 252/301.4 H, 301.6 R

[56] References Cited

U.S. PATENT DOCUMENTS

| | | | |
|---|---|---|---|
| 3,163,608 | 12/1964 | Yocom | 252/301.4 H |
| 4,719,385 | 1/1988 | Barrow | 313/463 |
| 4,751,427 | 6/1988 | Barrow | 313/503 |
| 4,801,844 | 1/1989 | Barrow | 313/509 |
| 4,894,116 | 1/1990 | Barrow | 156/643 |
| 4,954,747 | 9/1990 | Tuenge | 313/506 |
| 4,963,788 | 10/1990 | King | 313/503 |
| 5,072,152 | 12/1991 | Tuenge | 313/509 |
| 5,086,252 | 2/1992 | Kido | 252/301.4 H |
| 5,126,214 | 6/1992 | Tokailin | 428/690 |
| 5,164,799 | 11/1992 | Uno | 513/503 |
| 5,309,070 | 5/1994 | Sun | 313/503 |

OTHER PUBLICATIONS

A. H. Kitai, *Solid State Luminescence: Theory, Materials and Devices*. Chapman and Hall (1993) pp. 229–262.
H. Xian, G. Zhong, S. Tanaka, and H. Kobayashi, *Jpn. J. Appl. Phys.* 28, L1019 (1989).
S. Freed and S. Katcoff, *Physica* XIV, 17 (1948).
L. H. Brixner and A. Ferretti, *J. Solid State Chem.* 18, 111 (1976).
U. Caldino, M. E. Villafuerte–Castrejon, and J. Rubio, *Cryst. Latt. Def. and Amorph. Mat.* 18, 511 (1989).
U. Caldino, M. E. Villafuerte–Castrejon, and J. Rubio, *Cryst. Latt. Def. and Amorph. Mat.* 18, 511 (1989).
N. Miura, T. Ishikawa, T. Sasaki, T. Oka, H. Ohata, H. Matsumoto, and R. Nakano, *Jpn J. Appl. Phys.* 31, L46 (1992).
W. Kong, S. Ahmed, and R. Solanki, Dept. of Electrical Engineering and Applied Physics, Violet Lighty Emitting SrS:Eu Thin Film, Electroluminescent Devices, Jul. 3, 1995.
K. Ohmi, S. Tanaka, Y. ayamano, K. Fujimoto, H. Kobayashi, R. H. Mauch, K. O. Velthaus, H. W. Schock, *Japan Display*, 726, (1992).
W. Kong, J. Fogarty, R. Solanki, *American Institute of Physics*, 670 (Aug. 1994).
J. K. Lawson and Stephen S. Payne, *Physical Review B*, Excited–state absorption of Eu2+ –doped materials (1992).
Takao Kobayasi, Stanley Mroczkowski, James F. Owen, *Journal of Luminescence*, 21 (1980), 247–257.
James F. Owen, Paul B. Dorain, Takao Kobayasi, *J. Appl. Phys.* 52(3), Mar. 1981.
O. T. Antonayak, I. V. Kityk, N. S. Pidzyrailo, *Opt. Spectrosc.* (USSR) 63(3), Sep. 1987.
J. W. Li, Y. K. Su, T. S. Wu, M. Yokoyama, *Prog. Crystal Growth and Charact.*, 1992, vol. 25, pp. 103–129.

*Primary Examiner*—Louis M. Arana
*Assistant Examiner*—Vip Patel
*Attorney, Agent, or Firm*—Marger, Johnson, McCollom & Stolowitz

[57] ABSTRACT

A bright, short wavelength blue-violet phosphor for electroluminescent displays comprises an alkaline-based halide as a host material and a rare earth as a dopant. The host alkaline chloride can be chosen from the group II alkaline elements, particularly strontium chloride ($SrCl_2$) or calcium chloride ($CaCl_2$), which, with a europium (Eu) or cerium (Ce) rare earth dopant, electroluminesces at a peak wavelength of 404 and 367 nanometers (nm) respectively. The resulting emissions have CIE chromaticity coordinates which lie at the boundary of the visible range for the human eye thereby allowing a greater range of colors for full color flat panel electroluminescent (FPEL) displays.

11 Claims, 7 Drawing Sheets

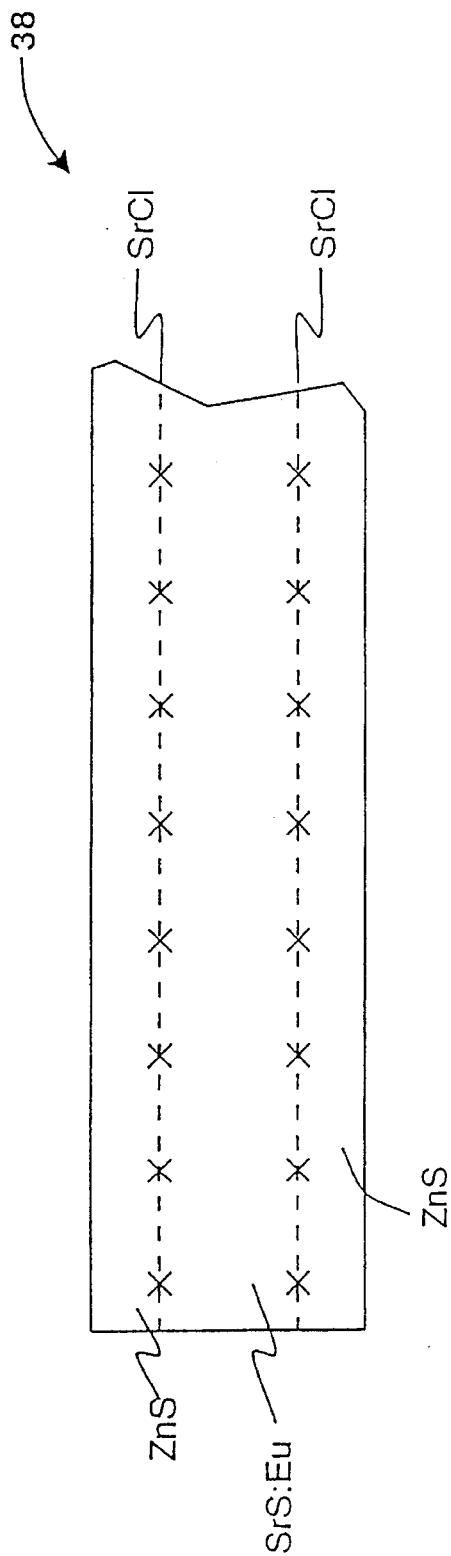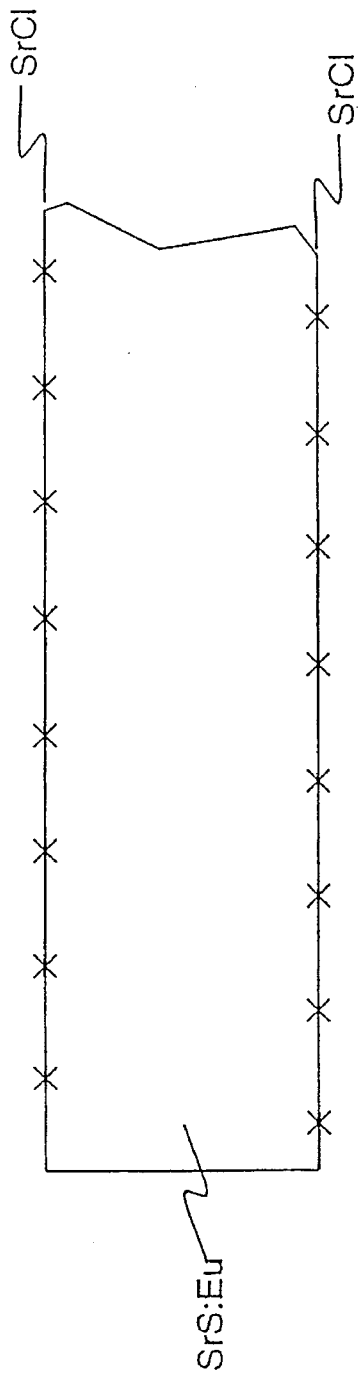

BLUE-VIOLET PHOSPHOR FOR USE IN ELECTROLUMINESCENT FLAT PANEL DISPLAYS

The U.S. Government has a paid-up license in this invention and the right in limited circumstances to require the patent owner to license others on reasonable terms as provided for by the terms of Contract No. N100014-93-0312 awarded by the Advanced Research Projects Agency (ARPA).

BACKGROUND OF THE INVENTION

The present invention relates generally to a thin electroluminescent (EL) display element. More particularly, it pertains to a thin film EL display element exhibiting short wavelength visible light or near ultraviolet emission characteristics and providing improved luminescent efficiency, high luminance, and stability.

In the area of information displays, cathode ray tube phosphors have proven themselves to be outstandingly efficient light emitters with excellent color capability. These types of displays, however, like the common picture tube, require an inordinate amount of space, especially when mated with ever-shrinking electronics. Flat panel display systems, such as those using a liquid crystal display panel with photoluminescent phosphor lamps, have grown in popularity, but lack brightness. A viable alternative to liquid crystal displays is the use of electroluminescent displays which offer increased brightness.

Thin film alternating current (AC) electroluminescent (EL) displays comprise a matrix of solid-state, wide-angle light emitting pixels or display elements. Amber light emitting ZnS:Mn EL phosphors have been the mainstay in EL displays for years, limiting the EL display range of color and, therefore, their acceptance. Rare-earth doped alkaline earth sulfide EL phosphors have been employed more recently in an effort to produce light over a wider range of colors within the visible spectrum, including realization of full-color displays, but with limited success.

An alternating current (AC) thin film electroluminescent TFEL display structure capable of emitting light of different colors typically has a capacitor-like structure as shown schematically in FIG. 1 and further detailed in A. H. Kitai, *Solid State Luminescence: Theory, Materials and Devices*. Chapman and Hall (1993) pp. 229–262. The display is made up of a transparent glass substrate 10, a transparent bottom electrode set 12 comprised of elongate conducting members, a first insulator layer 14, a luminescent semiconductor layer 16, and a second insulator layer 18, each layer formed on top of the other on the glass substrate. A top electrode set, such as conducting strips 20a and 20b, is deposited on top of the second insulator layer. Upon application of a strong electric field across the top and bottom electrode sets, the luminescent layer 16 at the intersection of each pair of energized electrodes (defining a display element) emits light which emanates through the transparent glass substrate 10.

Matrix-addressable TFELs are conventionally constructed by positioning the top and bottom electrode sets orthogonal to one another as described in U.S. Pat. No. 4,719,385 to Barrow et al and shown in FIG. 1. One way in which a plurality of colors may be displayed by a thin film EL device is by stacking such devices on top of one another, each containing a phosphor which emits a different color, thereby allowing different color combinations. A second arrangement is shown in U.S. Pat. No. 4,894,116 also to Barrow et al. which places the different phosphor materials emitting light in the three primary colors of red, green and blue in adjacent parallel strips within the electroluminescent layer, each color being addressable by electrodes placed in a matrix array. Whatever the arrangement, a need remains for a blue phosphor having both color purity and increased luminosity for the adequate formation of color combination schemes of the three primary colors.

In the foregoing thin film EL element having two dielectric layers, the luminescent layer 16 is made of a suitable luminescent host material doped with one or more impurities to form a luminescent center. A strong electric field applied to the luminescent layer 16 excites the electron energy level of the luminescent center. When the excited state returns to the ground state, the conversion of energy into light takes place. The result is electroluminescence.

More particularly, electroluminescence is thought to result from two mechanisms: electron impact and recombination. Electron impact occurs when a free electron, moving under a force generated by an external electric field, collides with another electron which resides in the dopant material. The impacting electron transfers energy to the other electron which consequently raises the impacted electron to a higher energy level. Because this new energy level is unstable, the electron soon de-excites thereby releasing the absorbed impact energy as luminescent light. Since luminescence by electron impact occurs when free electrons are accelerating under a force, electron impact luminescence is generally detected only in the presence of an active electric field. Thus, we would expect to see this type of mechanism during the leading edge of voltage pulses applied across the EL device as in FIG. 6(*b*).

Recombination results when free electrons moving through the EL material under an electric field are captured by the dopant atoms when the field is turned off and the electrons slow down. Recombining electrons consequently fall into a certain energy level and release their excess energy as photonic light. It is expected that this type of emission occurs at the trailing edge of voltage pulses as shown in FIG. 6(*c*).

For electroluminescence to take place, it is necessary that a strong electric field be applied to the luminescent layer and that the luminescent host material consequently have a broad band gap. A luminescent host material having a narrow band gap does not withstand the strong electric field applied to the luminescent layer. For this reason, conventional luminescent host materials have been selected from II–VI compounds, such as ZnS, SrS, CaS, and ZnSe, which have a broad band gap. The conventional luminescent center doping is typically either manganese (Mn) or europium (Eu), but can include such materials as samarium (Sm), terbium (Tb), cerium (Ce), and praseodymium (Pr).

Luminescent materials are also selected for their particular color emissions. The light emitted by electroluminescence has a specific wavelength which depends on the material used for the luminescent center. By combining the proper luminescent materials within a single device, the resulting color emission combinations could be suitable for multi-color display systems.

In order to form a white phosphor or otherwise obtain a full color spectrum display, the three primary colors red, green, and blue are combined. Heretofore, however, only electroluminescent materials which emit in the lower energy half of the visible light spectrum have been bright enough or stable enough for use in flat panel displays. Typical examples of electroluminescent materials used for displays include europium-doped calcium sulfide (CaS:Eu) which emits red light, europium-doped strontium sulfide (SrS:Eu) which emits orange-red light, manganese-doped zinc sulfide (ZnS:Mn) which emits yellowish orange light (although this phosphor material is generally filtered to obtain a bright red color), and terbium-doped zinc sulfide (ZnS:Tb) which emits green light. Unfortunately, blue and violet light emitting phosphors have generally weak light outputs, are expensive to produce, and are not durable for long term use.

It is advantageous for full color displays to yield light which is visible across as much of the spectrum to which the human eye is sensitive as possible. The human eye can only see light within the so-called visible spectrum, which consists of light with wavelengths from 400 to 700 nm. The CIE chromaticity curve 21, shown in FIG. 2, plots in two dimensions the light sensitivity range of the human eye wherein pure, essentially monochromatic light, lies on the curve 21 of the diagram. Impure or mixed hues visible to the human eye reside within curve 21. For example, ZnS:Mn emits yellowish-orange light with coordinates x=0.53, y=0.47 as shown at 22 and ZnS:Tb emits green light with coordinates x=0.31, y=0.60 as shown at 24. These values are approximate and can be altered depending upon the dopant concentration used in the phosphor material. In a di-phosphor compound using those two EL materials, one may obtain all colors which fall on line 26 connecting the two points 22, 24. By adding a third element, for example SrS:Ce with a blue-green chromaticity (x=0.20, y=0.36) shown at 27, one can obtain all color combinations which fall within the area shown at 28 and bounded by dashed-dot lines connecting the points 22, 24, 27. The greater the area, the more natural colors which can be obtained and displayed on the color display. It is thus advantageous to have an EL material which emits as close to the CIE boundary as possible to yield the maximum range of color combinations.

Fluorescent die organic compounds have been proposed for use within the emitting layer of an organic EL device to absorb EL emitted blue light and consequently emit a fluorescence in the bluish-green to red spectrum. Such a compound is disclosed in U.S. Pat. No. 5,126,214 to Tokailin et al. The organic material suggested by Tokailin et al., however, entails a complicated structure and provides concerns not existent in inorganic EL materials.

Alkaline earth sulfides have been proposed as blue emitters in a thin film electroluminescent (TFEL) panel as shown in Barrow et al. U.S. Pat. No. 4,751,427. The Barrow et al. patent discloses the use of strontium sulfide (Srs) as a host material doped with cerium fluoride ($CeF_3$) acting as an emitter to provide a source of photons. The problem with SrS:Ce, however, is that it has a blue-green chromaticity, which means that it is necessary to use a blue filter in conjunction with this material to achieve a blue chromaticity. When a filter is used, the luminance level is reduced to less than 15% of the original luminance. In addition, the luminance of this material tends to diminish dramatically as a function of time. The SrS material is hygroscopic and chemically unstable which adds complexity to the panel fabrication. Other blue-emitting phosphors have been investigated such as $SrGa_2S_4$:Ce, disclosed in Sun et al. U.S. Pat. No. 5,309,070, which has a blue color with coordinates x=0.15, y=0.10. Other conventional blue-emitting phosphors are shown as unnumbered points on FIG. 2 and include $CaGa_2S_4$:Ce, SrS:Ce, K and SrS:Ce. However, use of previous blue phosphors have only limited capability to emit shorter-wavelength violet light.

Accordingly, a need remains for luminosity stable blue-violet phosphor for use in electroluminescent flat panel displays.

SUMMARY OF THE INVENTION

It is, therefore, a principal object of the invention to provide a stable, efficient blue-violet emitting phosphor for a thin film electroluminescent (TFEL) device.

It is a further object of this invention to provide a stable source of near-UV light for fluorescent (photoluminescent) light sources.

Yet a further object of this invention is to provide a thin film inorganic laminate structure suitable for the manufacture of full color TFEL display panels.

According to the present invention, an AC TFEL panel includes sets of orthogonally disposed top and bottom electrodes formed in layers with an electroluminescent laminate structure which includes an electroluminescent phosphor layer deposited on at least one layer of insulator, sandwiched between the electrode layers, defining a matrix of display elements at intersections of the top and bottom electrodes. The invention includes the discovery of an electroluminescent material which comprises a group IIA or group IIB metal alkaline with a rare earth dopant, and that such material produces electroluminescent emission in the blue-violet to near UV spectrum.

The general chemical formula for an EL display element according to the invention is $MCl_2$:RE, where M is selected from the group comprising magnesium, calcium, strontium, barium or zinc, and the RE refers to a rare earth activator dopant. For a blue-violet emission source in a strontium-chloride TFEL device having a wavelength peak at 404 nanometers (nm), europium (Eu) is the preferred activator dopant. For a near-UV emission source having a peak at 367 nm, cerium (Ce) is the preferred dopant.

The preferred structure for a TFEL blue-violet or near-UV emitting device includes a glass substrate which supports a transparent electrode layer made of indium tin oxide (ITO). The substrate is then coated with an aluminum oxide/titanium oxide (ATO) composite to act as a dielectric film. An electroluminescent laminate comprising a layer of calcium- or strontium-chloride doped with europium, cerium or samarium is sandwiched between two layers of zinc sulfide (ZnS) deposited atop the dielectric film layer. All layers can be deposited using atomic layer epitaxy, evaporation, or sputtering.

The function of the ZnS layers is to provide protection during thermal annealing and to act as carrier injection layers. A second dielectric layer, this of aluminum oxide, is formed atop the upper ZnS layer after an annealing process, and a top (rear) aluminum electrode completes the fabrication of the device. The invention is, therefore, easy to fabricate and, additionally, provides stable electroluminescence.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 4A and 4B are cross sectional schematic views of a first example of the electroluminescent layer of the device of FIG. 3.

DETAILED DESCRIPTION

Figure 3:
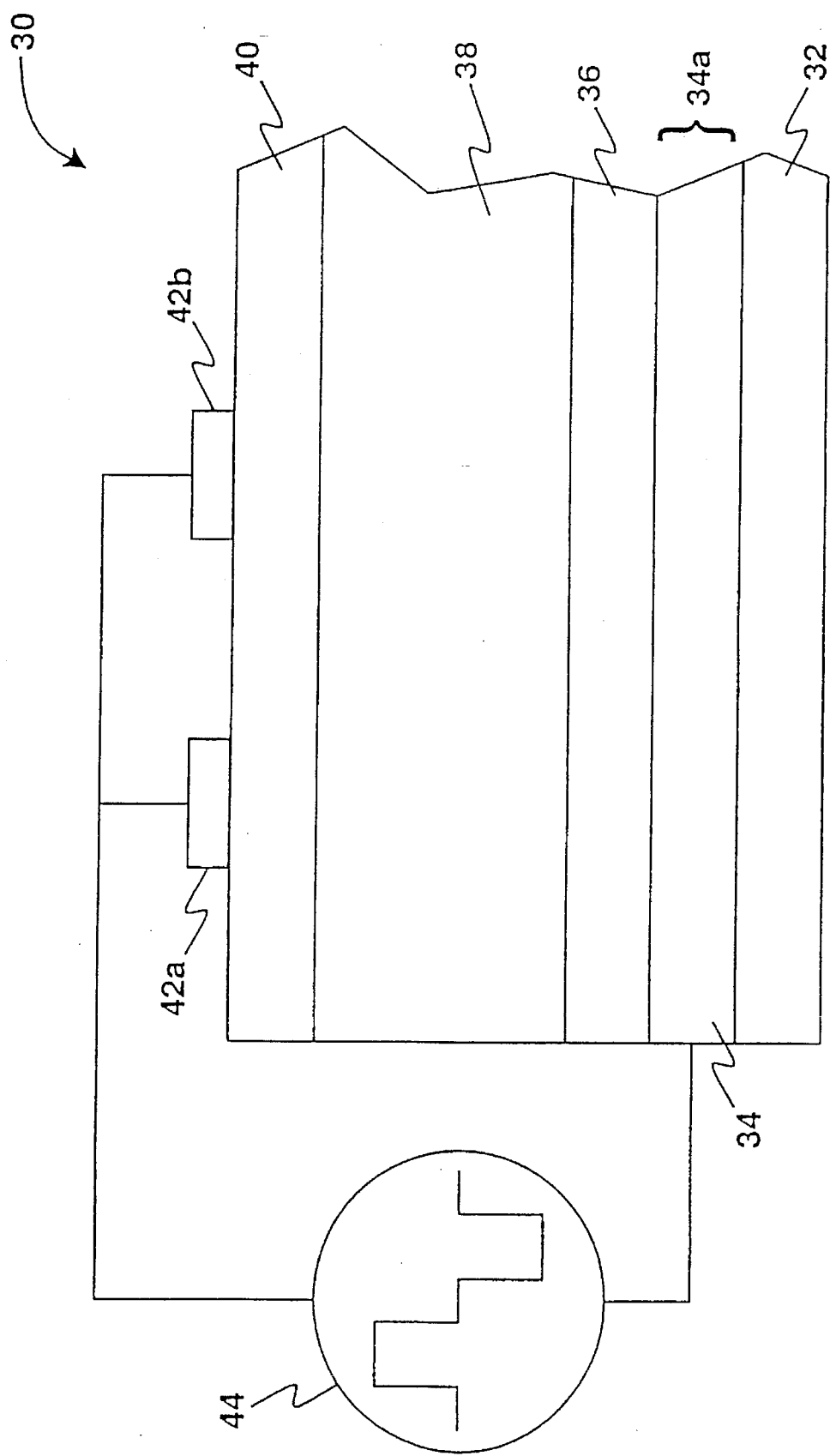
FIG. 3 is a cross sectional schematic view of the device constructed according to the invention.

FIG. 3 shows the layered structure of an electroluminescent display 30 constructed in accordance with the present invention. The device 30 includes a transparent substrate 32, a transparent conducting film 34 defining a plurality of electrodes including an electrode 34a, a first dielectric layer 36, a luminescent layer 38, and a second dielectric layer 40, each layer formed on top of the other on the substrate. A set of electrodes 42a, 42b, etc. are disposed atop layer 40 and oriented orthogonal to electrode 34a. The layers between the intersections of top and bottom electrodes, such as the intersection of respective electrodes 34a, 42a are selectively biased by a bipolar electric potential from an AC source 44 applied during operation of the device to stimulate photoluminescence in a portion of layer 38.

Transparent substrate 32 is generally glass with a predeposited 0.35 micrometer (μm) layer of indium-tin oxide (ITO) forming a transparent conducting film 34. First dielectric layer 36 is a transparent insulator material such as an aluminum oxide/titanium oxide composite of 0.26 μm thickness. Luminescent layer 38 is formed in accordance with the examples which follow and generally has a thickness of about 1 μm. Second dielectric layer 40 is another insulator material, typically $Al_2O_3$, with a thickness substantially equal to that of layer 36. All layers are formed using atomic layer epitaxy (ALE) although other deposition methods can be used, such as sputtering or evaporation. The Eu-and Ce-doped alkaline chloride devices were constructed according to the following examples.

EXAMPLE 1

Eu-doped electroluminescent devices were fabricated in the conventional double-insulating sandwich configuration. Two different structures of these devices were made. Both devices were fabricated on 5 cm square glass substrates 32 which had a predeposited 0.35 μm layer 34 of indium-tin oxide (ITO), followed by a 0.26 μm layer 36 of aluminum oxide/titanium oxide (ATO) composite. The first such device, having an electroluminescent layer 38 formed as shown in FIG. 4A, has a 0.1 μm undoped ZnS layer, followed by 0.8 μm SrS:Eu, and another 0.1 μm ZnS buffer layer. A top dielectric layer 40 of 0.24 μm $Al_2O_3$ is formed on top of the EL layer. The second set of devices, shown in FIG. 4B, were made without the ZnS buffer layers, i.e., SrS:Eu, followed by $Al_2O_3$, both of the same thicknesses as used for the structure in FIG. 4A. All these devices were made using atomic layer epitaxy (ALE).

The precursors for Sr, Ce and Eu were their respective beta-diketonates(-2,2,6,6-tetramethyl-3,5-heptanedione), whereas $Al_2O_3$ was grown using $AlCl_3$ and 2-methyl-2-propanol, and ZnS using $ZnCl_2$. The source of S for SrS and ZnS was $H_2S$. The Eu doping level was about "1 at %" meaning 1% of the atoms within the luminescent layer are Eu dopant. The growth temperature of SrS was 375° C. whereas ZnS and $Al_2O_3$ were grown at 425° C. and 400° C., respectively. All these layers were grown following one pumpdown. After the ALE growth of the stacks, aluminum dots (3 mm in diameter) were evaporated on the top insulator ($Al_2O_3$) to serve as the back electrode 34.

Figure 1:
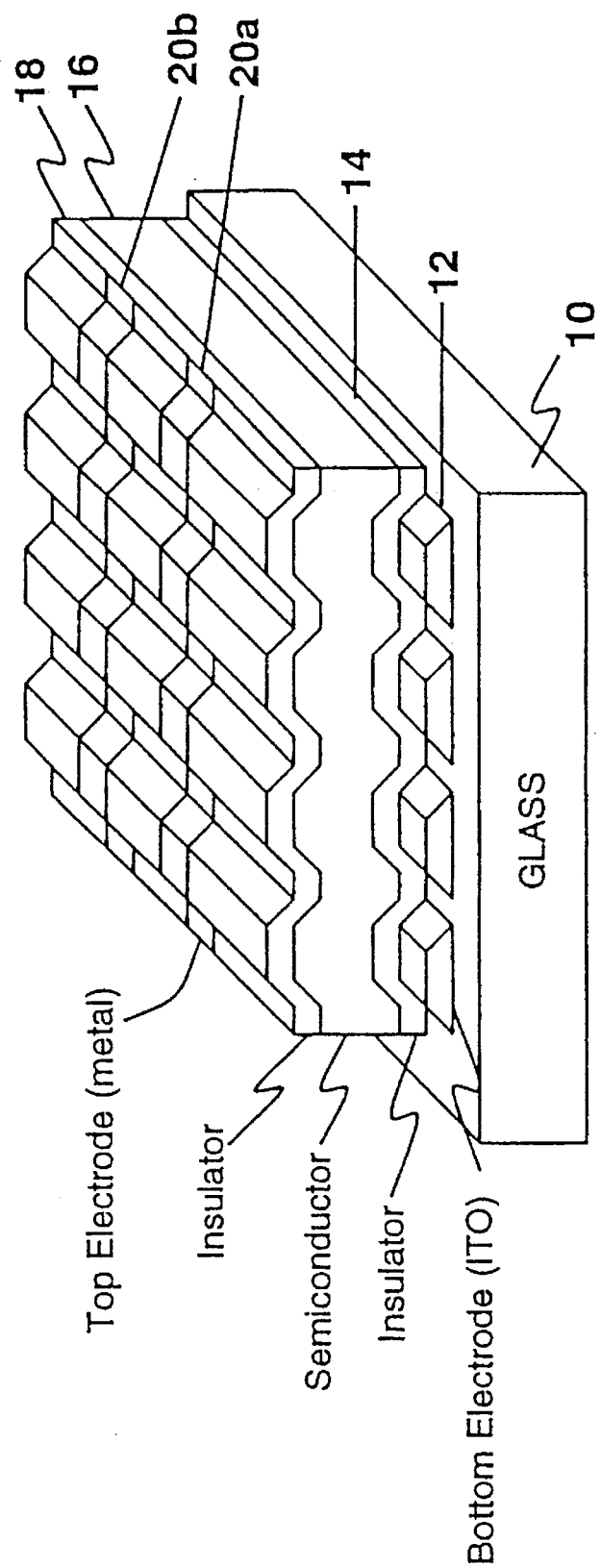
FIG. 1 is a perspective view of a typical sandwich style electroluminescent device showing the various layers.
Figure 2:
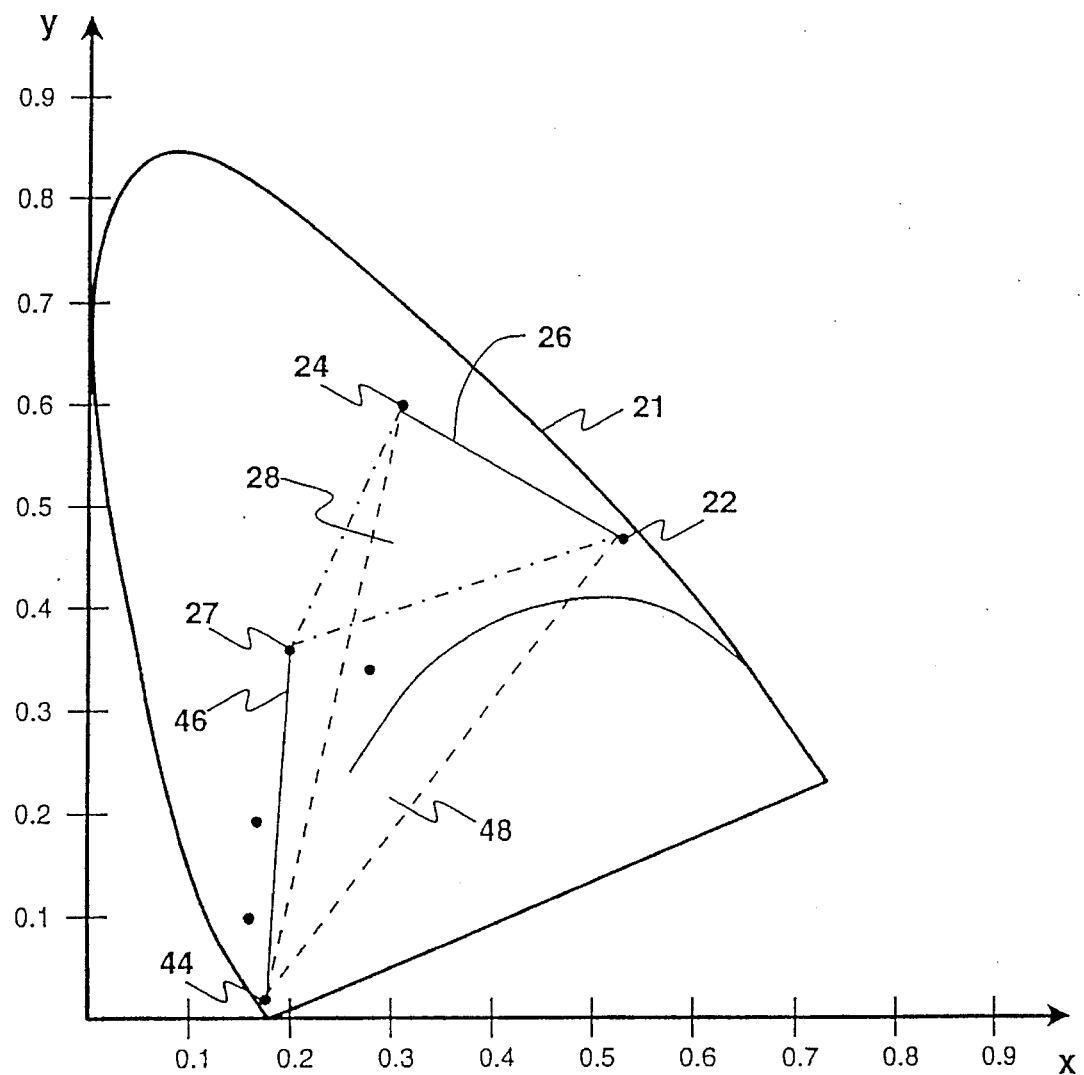
FIG. 2 is a graph showing the conventional light sensitivity of the human eye in two dimensions, also known as the 1931 CIE (Commission Internationale de l'Eclairage) chromaticity diagram. The light output of a typical blackbody radiator is shown within the diagram curve and data points of particular phosphors, including those constructed in accordance with the present invention, are plotted.
Figure 5:
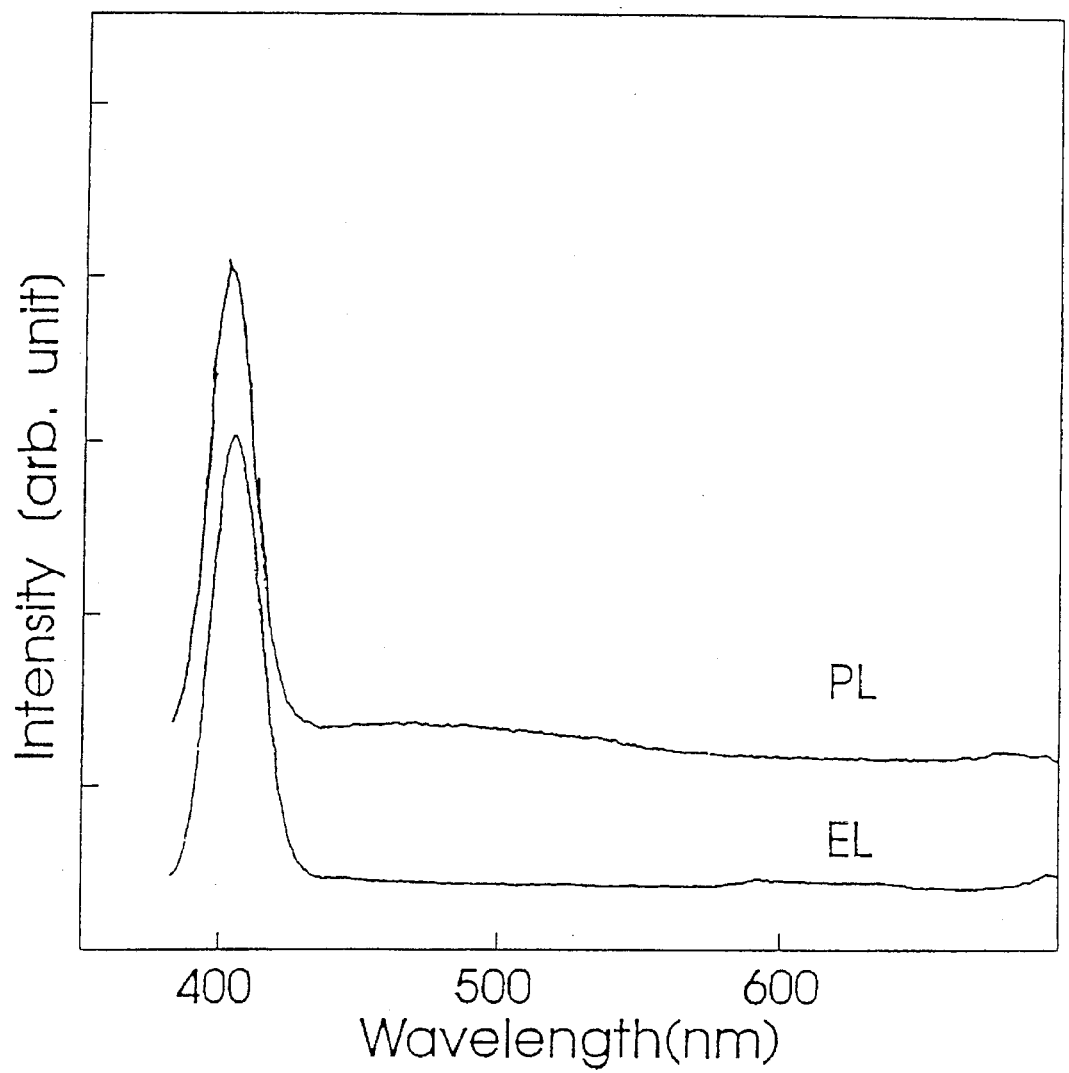
FIG. 5 is a graph showing the emission characteristics of the device of FIG. 3 under photoluminescent and electroluminescent stimulation.

The EL devices were powered by bipolar pulses of 30 μs duration with 5 μs rise and fall times, and a frequency of 1 kHz. The photoluminescent (PL) excitation source was an Ar ion laser which was operated at either UV (~360 nm) or visible (488 nm) wavelength. The EL emission spectrum of a Eu doped device with a FIG. 4A structure (i.e. with ZnS buffer layers) is shown in FIG. 5. The emission was bright (9 cd/m² at 40 V above threshold, 1 kHz) and violet in color with a peak at about 404 nm and full width half maximum (FWHM) of 20 nm, measured with a 0.25 m Jarrel-Ash spectrometer. This is a relatively bright source considering the location of this wavelength on the photoptic sensitivity curve. The CIE (Commission Internationale de l'Eclairage) chromaticity coordinates were x=0.17 and y=0.01 which places it at point 44 very near the boundary on the CIE diagram shown in FIG. 2. The corresponding PL spectrum (excited at ~360 nm) also showed a bright violet emission as shown in FIG. 5.

Color selectivity can be achieved when device 30 is combined with other phosphors. Returning to FIG. 2, by combining SrS:Ce (shown on the CIE graph as 27) with SrCl:Eu (shown at 44), the EL emission can be produced where the CIE coordinates lie on a line 46 connecting the two points. The coordinates will depend on the relative brightness of the two phosphors. Similarly, if used in a tri-phosphor device with ZnS:Mn and ZnS:Tb as cophosphors, the novel SrCl:Eu phosphor (constructed in accordance with the invention), can yield colors over a wide area as shown at 48 and bounded by the dashed lines connecting points 22, 24, 44. Area 48 far exceeds the conventional color area 28 thus allowing the display of a greater variety of natural colors when the present invention is utilized in full color TFEL devices.

These results were surprising since the prior art has reported only orange-red light from similar SrS:Eu device structures. It appears that our ALE grown samples were unintentionally codoped with Cl during fabrication, since $ZnCl_2$ was used as a precursor for the ZnS buffer layer growth. Grazing incidence x-ray analysis indeed showed, besides SrS (cubic phase) and ZnS (hexagonal phase), the presence of cubic $SrCl_2$. We should note that when SrS:Eu has been codoped with F or Cl (i.e. SrS:Eu,F and SrS:Eu,Cl), the result has been either a wavelength shift or a change in the emission spectrum profile of the orange-red EL emission. However, violet emission has not been reported. See, e.g., H. Xian, G. Zhong, S. Tanaka, and H. Kobayashi, *Jpn. J. Appl. Phys.* 28, L1019 (1989).

Figure 6:
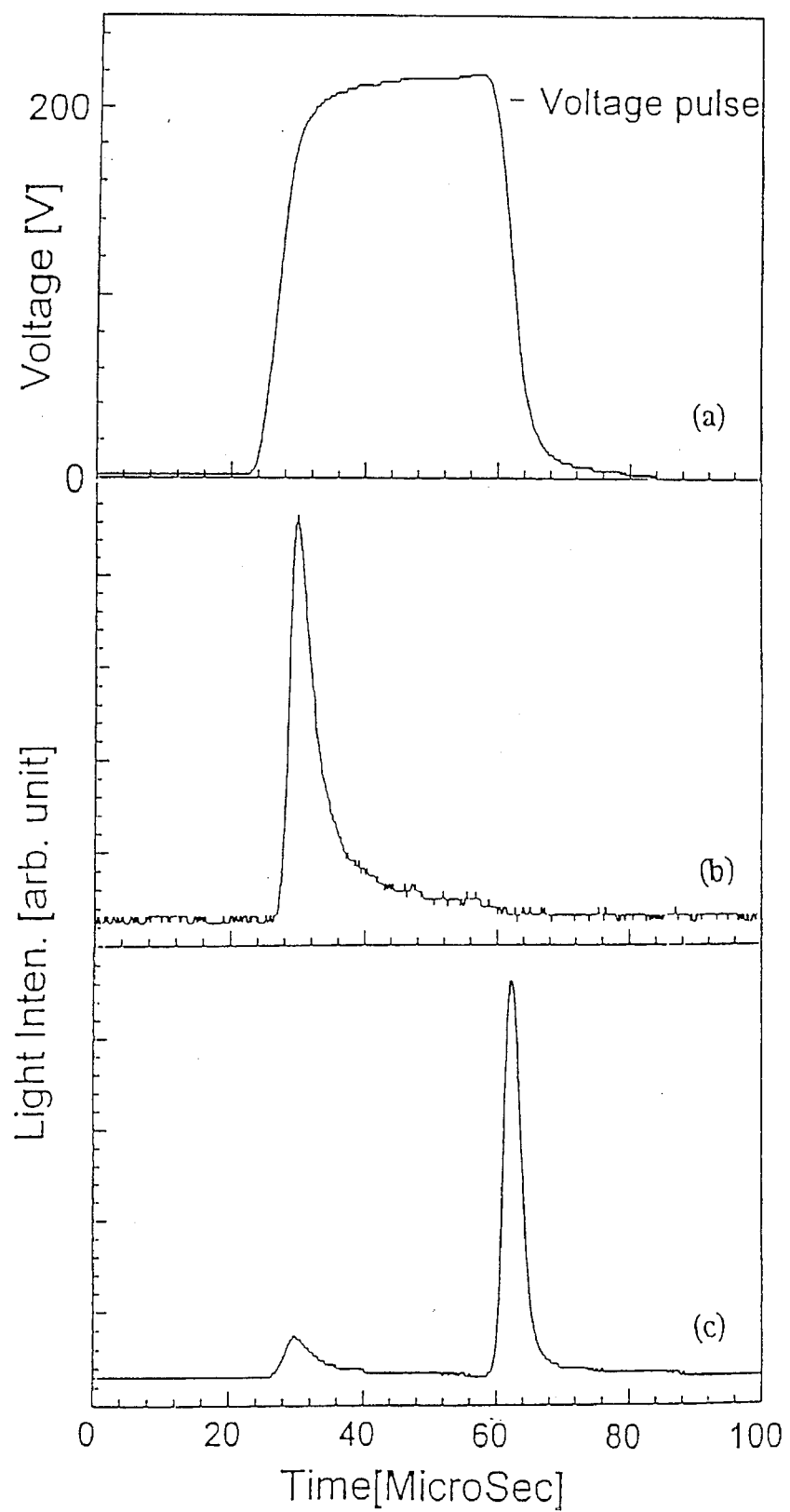
FIG. 6 is a graph showing the time-relative light emission characteristics of two aspects of the invention relative to an input voltage pulse during electroluminescence.

We believe that the source of the violet emission is the parity allowed $4f^65d$ to $4f^7$ transition of $Eu^{2+}$ in the $SrCl_2$ host, i.e., $SrCl_2:Eu^{2+}$. One of the earliest detailed reports of strong violet (centered at about 406 nm) photoluminescence from Eu doped $SrCl_2$ crystals dates back to 1948. S. Freed and S. Katcoff, *Physica* XIV, 17 (1948). More recently, several photoluminescent investigations have shown that $Eu^{2+}$ in alkaline earth fluoride and chloride hosts exhibits efficient 5d to 4f emission. See, e.g., L. H. Brixner and A. Ferretti, J. *Solid State Chem.* 18, 111 (1976); U. Caldino, M. E. Villafuerte-Castrejon, and J. Rubio, *Cryst. Latt. Def. and Amorph. Mat.* 18, 511 (1989); and N. Miura, T. Ishikawa, T. Sasaki, T. Oka, H. Ohata, H. Matsumoto, and R. Nakano, *Jpn J. Appl. Phys.* 31, L46(1992). In the $SrCl_2$ host the rare-earth ion occupies the metal site and is surrounded by the halides in eightfold coordination. The light emission occurs at the leading edge of the driving pulse, implying electron impact as the likely excitation mechanism (FIG. 6b). It is interesting to note that recent activity in the 5d to 4f transition of $Eu^{2+}$ doped alkaline earth halides was enticed by the possibility of achieving tunable ultraviolet and blue-green laser emission. However, electroluminescence of Eu in blue-violet is not suggested in the art and electroluminescent emission of $SrCl_2$ phosphors have not been reported.

X-ray analysis of the violet light emitting devices showed presence of both SrS and $SrCl_2$. Therefore, we expect thin layers of $SrCl_2$ to be located near the two SrS/ZnS interfaces shown in FIG. 4A. However, the violet emission from these thin layers clearly dominates the orange-red emission from $SrS:Eu^{2+}$, which can be observed only under higher gain settings of the detector. Moreover, the violet emission has been very stable after several hours of operation. Although lifetime studies to determine the long term stability of these devices have not been performed, the $SrCl_2$:Eu composition should be highly stable when coated by methods known in the art to reduce the alkaline halide's reactivity with the air.

To reduce the presence of Cl, the second set of devices (FIG. 4B) were fabricated and tested for comparison without ZnS buffer layers. The EL emission spectrum of these devices was orange-red with a small peak in the violet. The orange-red spectrum is similar to what has been reported in the prior art. Maximum brightness of 470 $cd/m^2$ (at 9 kHz) was recorded. Most of the emission occurred at the trailing edge of the voltage pulse (FIG. 6c), indicating recombination as the dominant excitation mechanism, i.e., electrons ionized from the Eu ion to the SrS conduction band are trapped back to the $4f^65d^1$ excited state of $Eu^{2+}$. The de-excitation of electrons from this state to the $4f^7(^8S_{7/2})$ level produces the orange light. A small violet peak was also observed which was probably due to the $SrCl_2$ host formed at the $SrS/Al_2O_3$ interface where $AlCl_3$ was the source used to grow $Al_2O_3$. A separate set of devices of a FIG. 4B structures was also fabricated where Eu and Cl were delivered to the substrates from the same source tube so that Eu was most likely in the form of europium chloride. This time the brightness of the orange-red emission spectrum increased but there was no violet peak. The most likely reason is that there was no free Cl available to form $SrCl_2$.

EXAMPLE 2

Figure 7:
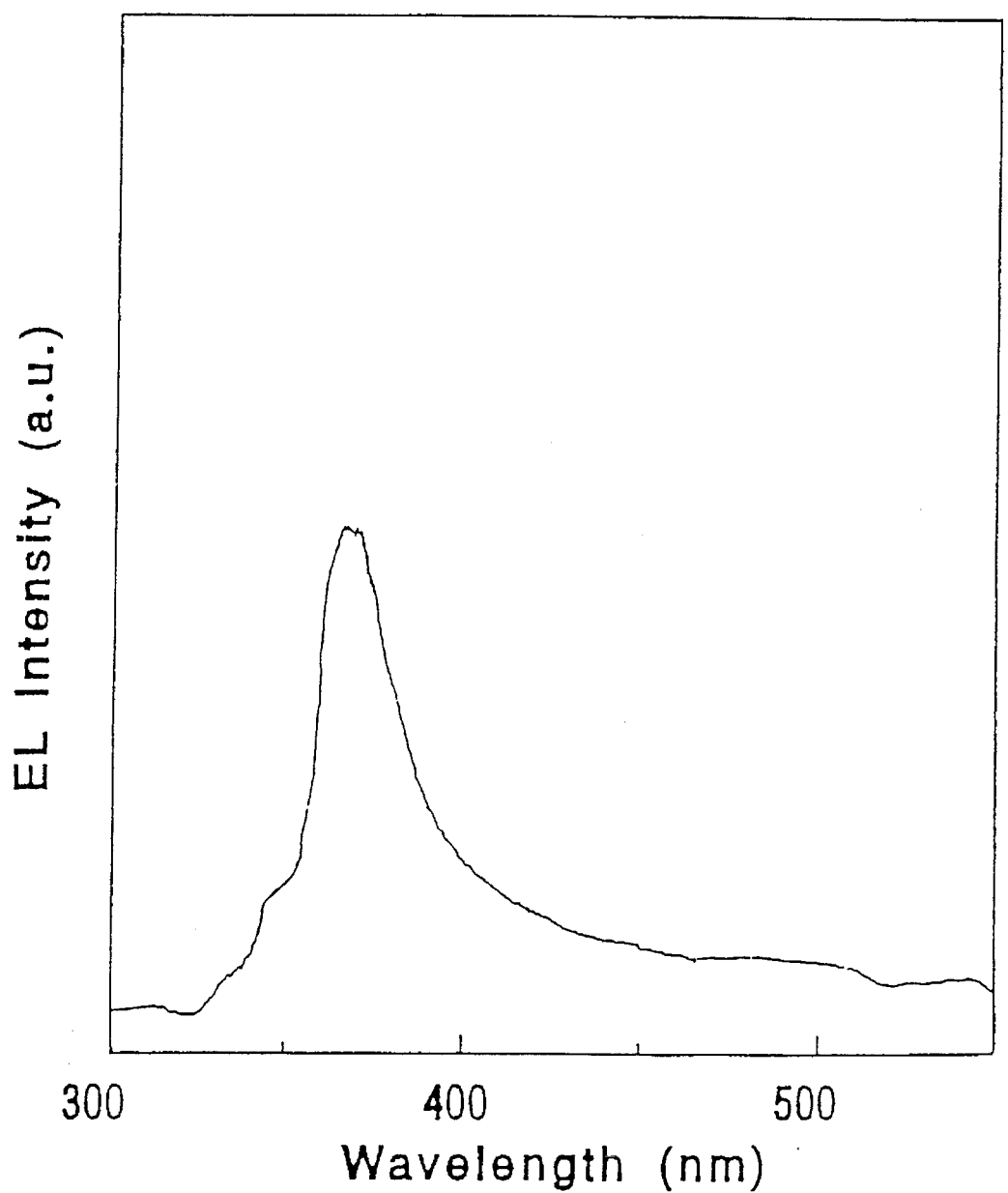
FIG. 7 is a graph showing the EL emission characteristics of an alternate embodiment of the invention.

A set of ZnS/SrS:Ce/ZnS devices were similarly fabricated and characterized for emission, showing similar Cl codoping as in Example 1. In these structures, SrS was doped with Ce only near the ZnS interfaces. EL emission was observed at about 367 nm, with a shoulder at about 344 nm (FIG. 7). This light originates from $SrCl_2$:$Ce^{3+}$ layers and the peaks correspond to transitions from lower excited 5d states of $Ce^{3+}$ to $^2F_{5/2}$(344 nm) and $^2F_{7/2}$ (367 nm) states. From time-resolved emission characteristics, we conclude that electron impact is the excitation mechanism. The intensity of this emission, 0.01 $mW/m^2$ at 40 V above threshold, was much weaker than the violet light produced by the FIG. 4A device in Example 1. Moreover, the short wavelength of this radiation precludes using it as a direct source for display applications. However, it is possible to use the UV radiation in combination with fluorescent dyes to produce visible light.

EXAMPLE 3

$SrCl_2$:Eu was directly deposited on a two inch square substrate using thermal evaporation. Unlike the phosphor in Example 1, a SrS host material was not used. The evaporation sources were $SrCl_2$ and about 0.1 molar $EuCl_2$. This mixture was evaporated on glass substrates that were precoated with a layer of indium tin oxide (ITO), followed by aluminum oxide-titanium oxide (ATO) composite insulator, as described above. After evaporating a phosphor layer of about 0.3 micrometers thick, aluminum oxide was deposited on these substrates as the top insulator using atomic layer epitaxy. This was followed by deposition of aluminum back electrodes. When a bipolar pulse was applied to this device, violet light was emitted similar to the 404 nm emission obtained in Example 1.

Other experiments have revealed similar blue-violet or UV electroluminescent emissions when the above TFEL devices are constructed with other alkaline halide phosphors with rare earth dopants. For example, a samarium doped strontium chloride ($SrCl_2$:Sm) phosphor yielded a violet electroluminescent emission centered around 401 nm. A cerium doped calcium chloride ($CaCl_2$:Ce) phosphor resulted in a UV emission centered at 390 nm. When the calcium chloride host material was doped with europium, the resulting blue-violet emission had a wavelength of 450 nm. Other alkaline halide phosphors, having the chemical formula MCl:RE where M is selected from the group consisting of calcium, strontium, zinc, or barium, and RE comprises a rare earth activator dopant such as Ce, Eu, Sm, should yield similar blue-violet or near-UV emission characteristics when undergoing electroluminescence.

In summary, we have demonstrated for the first time bright violet emission from an EL device and electroluminescence of $SrCl_2$:Eu. The source of this radiation is attributed to the 5d to 4f transition of the $Eu^{2+}$ activator in the $SrCl_2$ host formed at the SrS/ZnS interfaces. A weaker near UV emission from $SrCl_2$:$Ce^{3+}$ is also obtained. Although many of the alkaline earth halides are known to be moisture sensitive, they could fill the void existing in the art due to the lack of bright blue EL sources, provided an effective means of encapsulating these layers is employed. It should be possible to increase the brightness of the violet emission by using multiple SrS/ZnS layers within the sandwich structure of these devices.

The electrodes may be arrayed in the conventional form to yield a matrix-addressable TFEL device capable of displaying a plurality of colors using the aforementioned violet or near-UV phosphors.

Having described and illustrated the principles of the invention in a preferred embodiment thereof, it should be apparent that the invention can be modified in arrangement and detail without departing from such principles. We claim all modifications and variation coming within the spirit and scope of the following claims:

What is claimed is:

1. A thin film electroluminescent (TFEL) element in a display comprising a transparent substrate, a transparent conducting film defining a first electrode, a first dielectric layer, a luminescent layer, and a second dielectric layer, each layer formed on top of the other on the substrate, the second dielectric layer being provided with a second electrode, the luminescent layer including:

a strontium chloride (SrCl$_2$) host layer; and a rare earth dopant.

2. The EL element of claim 1, wherein the rare earth dopant is selected from a group consisting of divalent europium (Eu$^{2+}$) and trivalent cerium (Ce$^{3+}$).

3. A thin film electroluminescent (TFEL) device comprising a front electrode set deposited on a transparent substrate, a rear electrode set, and a thin film laminate sandwiched between said front and rear electrode sets, said thin film laminate including at least a pair of insulating layers sandwiching an alkaline halide phosphor layer having the chemical formula:

MCl$_2$:RE where M is selected from the group consisting of calcium, strontium, zinc, and barium, and RE comprises a rare earth activator dopant.

4. The device of claim 3 where M is strontium.

5. The device of claim 3 where M is calcium.

6. The device of claim 3 where M is barium.

7. The device of claim 3 where M is zinc.

8. The device of claim 3 where RE is europium.

9. The device of claim 3 where RE is cerium.

10. The device of claim 3 where RE is samarium.

11. The device of claim 3 further including a pair of protective film layers sandwiching the alkaline halide phosphor layer and interposed between the pair of insulating layers.

* * * * *